United States Patent [19]
Takagi et al.

[11] 3,871,691

[45] Mar. 18, 1975

[54] PIPE JOINT

[76] Inventors: Tatsuya Takagi, No. 6-10 Araebisumachi; Teruya Takagi, No. 6-4 Araebisumachi, both of Nishinomiya-shi, Japan

[22] Filed: Aug. 14, 1973

[21] Appl. No.: 388,144

[30] Foreign Application Priority Data
Aug. 14, 1972 Japan.............................. 47-80801
Sept. 4, 1972 Japan.............................. 47-87974

[52] U.S. Cl. .............................. 285/321, 285/369
[51] Int. Cl. ............................................ F16l 39/00
[58] Field of Search .......... 285/321, 369, 276, 340; 151/41.75

[56] References Cited
UNITED STATES PATENTS

| | | | |
|---|---|---|---|
| 1,116,387 | 11/1914 | Coda............................... | 285/276 X |
| 1,354,710 | 10/1920 | Wise............................... | 285/276 X |
| 3,279,835 | 10/1966 | Krohm............................. | 285/321 X |
| 3,637,239 | 1/1972 | Daniel............................. | 285/321 X |

FOREIGN PATENTS OR APPLICATIONS

| | | | |
|---|---|---|---|
| 1,034,886 | 4/1953 | France............................. | 285/321 |
| 453,386 | 12/1948 | Canada............................ | 285/323 |

*Primary Examiner*—H. Hampton Hunter
*Attorney, Agent, or Firm*—Stewart and Kolasch, Ltd.

[57] ABSTRACT

A pipe joint comprising an elliptical spring ring fitted in an annular groove in the outer surface of a pipe to be joined, a joint body having its inner surface with a diameter slightly larger than the outer diameter of the pipe and an annular groove formed in its inner surface for receiving the elliptical ring, wherein when the pipe is inserted endwise into the joint body, the ring is caused to seat in the annular groove in the pipe and dispose the pipe in a locking engagement with the joint body.

4 Claims, 5 Drawing Figures

PIPE JOINT

FIELD OF THE INVENTION

The present invention relates to a joint for pipes made of steel, stainless steel, etc. used in a high pressure fluid piping system, and more particularly to a joint for use with pipes having a small diameter of about 10 mm to 38 mm.

BACKGROUND OF THE PRIOR ART

Welded joints and intruded joints have been used for the above-mentioned pipes, but these joints have the disadvantages that they are difficult to assemble and the piping costs are very high.

Accordingly, it is an object of the present invention to provide a novel and improved pipe joint, wherein the pipe and joint can be readily placed into tight locking engagement with each other by the endwise insertion of the pipe into the joint.

Another object of the present invention is to provide a PiPe joint which is less costly than an intruded joint.

Still another object of the present invention is to provide a pipe joint, wherein threading or welding is not needed in the process of coupling.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

The pipe joint according to the present invention comprises the pipe to be joined, a joint body and a spring lock-ring. The body has its inner diameter larger than the outer diameter of the pipe and its inner circumference is provided with an annular groove in which the spring lock-ring is fitted. The spring lock-ring has, in contour, an elliptical shape and has a circular cross section. The inner diameter of the minor axis of the elliptical lock-ring is smaller than the outer diameter of the pipe. The spring lock-ring also has a split portion in its circumference.

The diameter in the bottom of the annular groove is greater than the sum of the outer diameter of the pipe and double the thickness of the lock-ring. The pipe also has in its outer surface an annular groove formed by rolling. The pipe has at its end a tapered annular outer surface. When the pipe is axially inserted into the joint body, the lock-ring is caused to seat in the annular groove in the pipe and dispose the pipe in locking engagement with the body.

The annular groove in the pipe is, in section, a semicircle. The annular groove in the joint body has on the side in engagement with the lock-ring an annular tapered wall extending convergently from its bottom, i.e., from the pipe to the inner surface so as to constrict the lock-ring under pressure.

In another embodiment of the present invention, the joint further comprises a fastener threadedly inserted in the body. The annular groove for receiving the lockring is formed with both the inner shoulder of the body and the tapered annular inner surface at the forward end of the fastener.

In still another embodiment of the present invention, the pipe joint further comprises a sleeve disposed over the outer surface of the pipe and between the inner shoulder of the body and the tapered inner surface of the nut. The sleeve has at its forward end a tapered annular inner surface forming the annular groove together with the inner shoulder of the body for receiving the lock-ring. At its rear end the sleeve is provided with a tapered annular outer surface in abutting engagement with the tapered annular inner surface of the nut.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
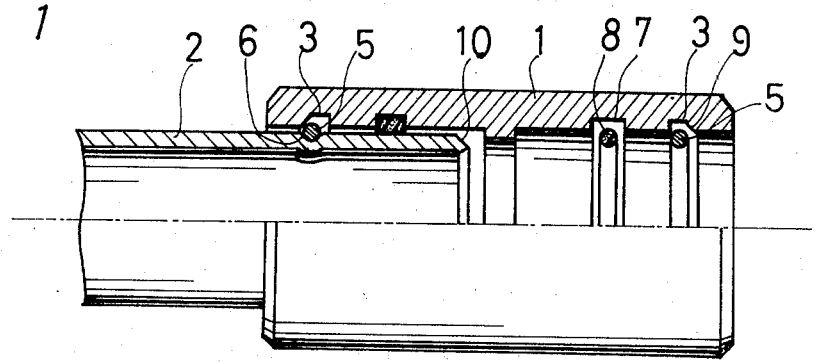
FIG. 1 is a view, partly in longitudinal cross section, of one embodiment of the pipe joint according to the present invention. The left half shows the joint coupled with the pipe and the right half shows the joint disengaged from the pipe.
Figure 2:
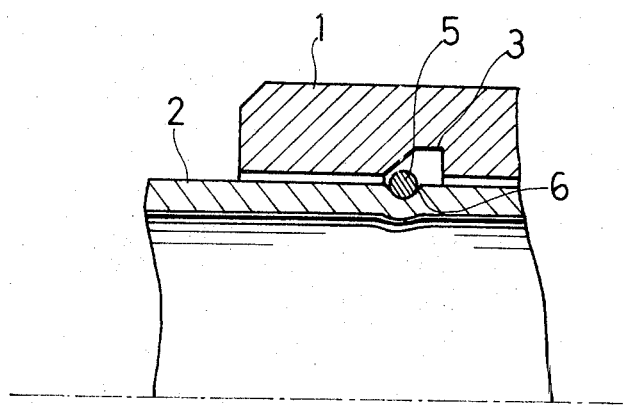
FIG. 2 is an enlarged fragmentary sectional view showing the coupling elements of the joint of FIG. 1 in an assembled position.
Figure 3:
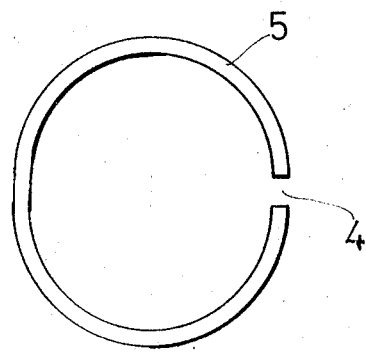
FIG. 3 is a front view of the spring lock-ring.

Referring to FIGS. 1 to 3, the pipe joint illustrated therein comprises a joint body 1 having an annular groove 3 formed along its inner periphery, a pipe 2 to be joined, and a spring lock-ring 5 disposed in the annular groove 3 in the joint body. The ring 5, which can be made of a resilient metal wire or stainless steel wire such as a piano wire, has a circular cross section and a split portion 4 in its circumference. An annular groove 6 is formed on the outer surface of the pipe 2 by coldrolling, said groove having a semi-circular section. The pipe 2 has formed at its end a radially inwardly tapered outer surface 10.

The ring 5, as is shown in FIG. 3 has the shape of an ellipse. The outer diameter of the major axis of the elliptical ring 5 is equal to or slightly larger than the diameter in the bottom of the groove 3 and the inner diameter of the minor axis of the ring is slightly smaller than the outer diameter of the pipe 2 or approximately equal to the diameter in bottom of the rolled groove 6 in the pipe. Thus the ring 5 will always locate coaxially or neutrally in the annular groove 3 in the body.

When the pipe 2 is inserted endwise into the body 1, the pipe with its tapered outer surface 10 causes the ring 5 to expand and enter the inside of the body.

Since the diameter in the bottom of the groove 3 is slightly larger than the sum of the outer diameter of the pipe 2 and double the thickness of the wire of ring 5, the groove 3 has a space sufficient to receive the lockring 5, which enables said lockring to ride over the outersurface of the pipe 2, thereby permitting further insertion of the pipe into the body 1. As the pipe 2 is inserted, the groove 6 eventually reaches a position opposite to the groove 3, so that the ring 5 falls in groove 6 due to its own resilience. Thus, the pipe 2 and the body 1 are brought into locking engagement with each other and the pipe is prevented from disengaging from the body 1 since the outer diameter of the ring is larger than the inner diameter of the body.

The forward side wall 9 of the groove 3 extends axially and divergently from the inner surface of the inside portion of body 1 to the bottom of groove 3, as seen in FIG. 2. Thus, the greater the thrust exerted, due to inner pressure in the pipe forcing the pipe to disengage from the body 1, the more strongly the ring 5 will constrict the pipe and prevent it from disengaging from the body.

In addition, the pipe joint of the present invention has in its inner surface a second annular groove 7 in which an O-ring 8 which can be made, for example, of a synthetic rubber, is fitted. When the pipe is inserted into the joint, the O-ring 8 is radially compressed and brought into intimate contact with both the outer surface of the pipe 2 and the bottom of the annular groove 7, thereby providing a fluid-tight seal between the joint body and the pipe.

Figure 4:
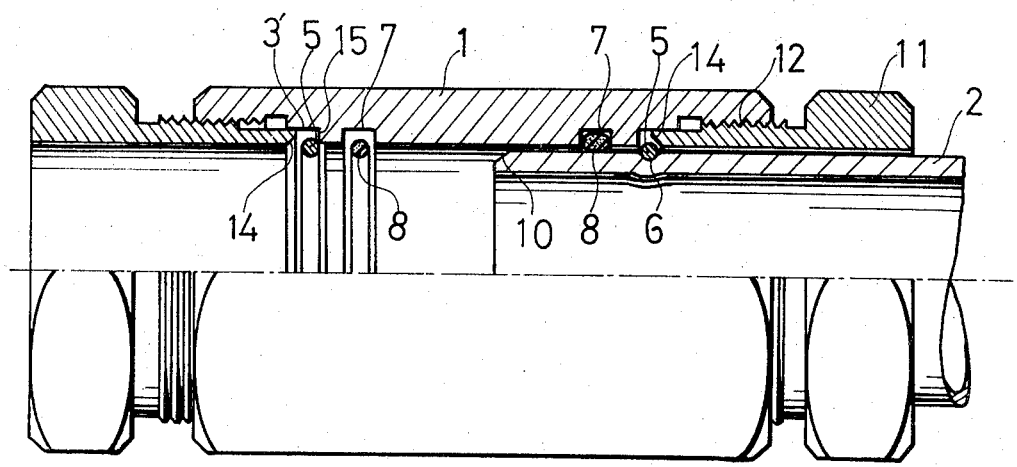
FIG. 4 is a view, similar to FIG. 1, of another embodiment of the inventive pipe joint, showing on the right half the pipe joint in coupling engagement with an axially inserted pipe.

In the embodiment of FIGS. 1 and 2, once the pipe is coupled in the joint, it cannot be removed therefrom, so that when used in a situation where vibrations occur, the pipe will inevitably be loosened from the joint due to the vibrations. The embodiment shown in FIG. 4 eliminates this problem. The pipe joint of FIG. 4 is provided on each of its sides with a fastener 11, said fastener having at its forward end an annular tapered inner surface 14. The fastener and the joint body 1 are combined with each other in threading engagement via their threaded portions 12. In assembling the pipe joint, the fastener 11 is combined with the joint body 1 prior to the endwise insertion of the pipe 2 into the joint body. Thus, the lock-ring 5 is constricted by the tapered inner surface 14 at the forward end of the fastener and the pipe 2 is tightly bound in the annular groove 6. In the joint of FIG. 4, the groove 3' for receiving the ring 5 is formed by the inner shoulder 15 of the body 1 and the tapered inner surface 14 at the forward end of the fastener 11.

Figure 5:
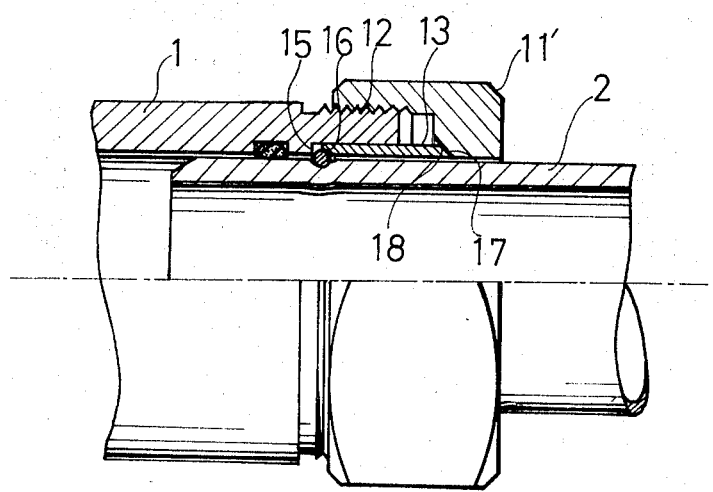
FIG. 5 shows still another embodiment of the pipe joint according to the present invention.

Referring to FIG. 5, the fastener comprises a sleeve 13 and an enclosure nut 11'. The sleeve 13 has a tapered inner surface 16 at its forward end and a tapered outer surface 17 at its rear end. The surface 16 together with the shoulder 15 of the joint body forms the groove 3'. The outer surface 17 is in engagement with the tapered inner surface 18 of the nut 11'. When the nut 11' is threaded onto the joint body 1, the rear end portion of the sleeve 13 is radially reduced causing the tapered inner surface of the nut to come into tight contact with the pipe 2. It can be readily understood that in the joints of FIGS. 4 and 5 the pipe is removable and when tightly coupled, the joint cannot be loosened by vibration. Thus, the joint of FIG. 5 is more suitable for use in locations where vibration occurs than the joint of FIG. 4.

In general, the joint of the present invention can be effectively used with pipes with small tolerances in their outer diameter such as a precision steel pipe used in an oil pressure device rather than for pipes with relatively large tolerances.

The strength of the pipe according to the present invention will be now explained in connection with the following examples which are not to be considered as limiting.

EXAMPLE 1

A mild steel pipe coupled with a mild steel joint body was tested, the pipe having an outer diameter of 15 mm, a thickness of 1 mm, a Vickers hardness of 120, and a tensile strength of 40 kg/sq.mm. The pipe has on its outer surface an annular groove formed by cold rolling, said groove having, in section, a depth of about 0.5 mm and having the shape of a semi-circle with a diameter of 1 mm. It is well known that the pipe as described above is normally worked by cold rolling. For endwise insertion of the pipe, it is provided at its end with a tapered outer surface formed by rolling or other known methods. The rolled groove in the pipe has a Vickers hardness of 210 and an estimated tensile strength of 67 kg/sq.mm corresponding thereto. This indicated that, irrespective of its reduction in thickness, the tensile strength of the pipe was increased by rolling and that the pipe would break elsewhere than at the groove. The sectional shape of the groove may be other than semi-circular, but the semi-circular shape is the most desirable. Neither the rectangular shape or the V-shape is undesirable, but the former cannot be worked by rolling and the latter is weak in strength. The joint body has a tensile strength of 38 kg/sq.mm. The result of the pressure test disclosed that the pipe would burst under a pressure of 500 atm.

EXAMPLES 2 and 3

In another test for a thick walled pipe having a thickness of 2.2 mm, and made of mild steel, it was determined that the pipe would burst under a pressure of 1,250 atm.

It still another test of a thicker walled pipe, it was determined that the pipe would disengage from the joint at a pressure of 1,400 atm.

In brief, the pipe assembled with the pipe joint of the present invention has no weak portions and no corrosion formed therein. The inventive pipe joint is also useable for thin walled pipes that have not been joined to conventional joints. The pipe, when assembled in the pipe joint, has a strength greater than its own rupture strength, and has a high resistance to leakage under high pressure. The pipe joint according to the present invention is characterized in that it is inexpensive to produce and simple in effecting the pipe-joining operation.

the invention being thus described, it will be obvious that the same may be varied in many ways. Such variations are not to be regarded as a departure from the spirit and scope of the invention, and all such modifications are intended to be included within the scope of the following claims.

What is claimed is:

1. A pipe joint having a joint body with the inner diameter thereof larger than the outer diameter of a pipe to be joined, which comprises an annular groove formed in the inner circumference of said joint body, a spring lock-ring fitted in said annular groove, said spring lock-ring being, in contour, elliptically shaped in such a manner that the inner diameter of the minor axis is smaller than the outer diameter of the pipe, said spring lock-ring also having a split portion in its circumference, said annular groove in said joint body having from its bottom a diameter greater than the sum of double the thickness of said spring lock-ring and the outer diameter of the pipe, an annular groove formed by rolling in the outer surface of said pipe, said annular groove in said pipe being spaced a predetermined distance from the end of the pipe, said pipe having a tapered outer surface formed at its annular end, wherein, when the pipe is inserted endwise into said joint body, said spring lock-ring is caused to seat in said annular groove in the pipe and dispose the pipe in locking engagement with said joint body and a fastener loosely mounted over the outer surface of the pipe and in threading engagement with said joint body, said fastener having formed at its inside portion a tapered annular inner surface, said joint body having an annular inner shoulder radially extending from its first inside portion having an inner diameter substantially equal to the outer diameter of said pipe to its second inside portion having an inner diameter larger by a predetermined amount than the outer diameter of said pipe, whereby said annular groove is formed for receiving said spring lock-ring by said inner annular shoulder of said joint body and said tapered annular inner surface of said fastener.

2. The pipe joint according to claim 1, wherein said fastener comprises a sleeve and a nut, said sleeve being mounted over the outer surface of said pipe and between said inner shoulder of said joint body and said tapered annular inner surface of said nut, said sleeve having at its forward end a tapered annular inner surface and at its rear end a tapered outer annular surface in abutting engagement with said tapered annular inner surface of said nut, whereby said annular groove for receiving said spring lock-ring is formed with both said inner annular shoulder of said joint body and said tapered annular inner surface of said sleeve.

3. The pipe joint according to claim 1, wherein said annular groove in said pipe has a semi-circular cross sectional shape and said spring lock-ring has a circular cross sectional shape.

4. The pipe joint according to claim 1, wherein said joint body has a second annular groove in the inner surface thereof for mounting therein an O-ring.

\* \* \* \* \*